United States Patent
Hu et al.

(10) Patent No.: US 11,616,914 B2
(45) Date of Patent: Mar. 28, 2023

(54) TRACKING OBJECTS USING SENSOR ROTATION

(71) Applicant: Intel Corporation, Santa Clara, CA (US)

(72) Inventors: Wei Hu, Shanghai (CN); Jianxin Fan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 15/734,505

(22) PCT Filed: Dec. 28, 2018

(86) PCT No.: PCT/CN2018/124735
§ 371 (c)(1),
(2) Date: Dec. 2, 2020

(87) PCT Pub. No.: WO2020/133175
PCT Pub. Date: Jul. 2, 2020

(65) Prior Publication Data
US 2021/0235020 A1    Jul. 29, 2021

(51) Int. Cl.
*H04N 5/00*        (2011.01)
*G03B 5/00*        (2021.01)
(Continued)

(52) U.S. Cl.
CPC .......... *H04N 5/23299* (2018.08); *G03B 5/00* (2013.01); *G03B 13/36* (2013.01); *H04N 5/2226* (2013.01);
(Continued)

(58) Field of Classification Search
CPC ......... H04N 5/23299; H04N 5/232122; G03B 5/00; G03B 13/36
(Continued)

(56) References Cited

U.S. PATENT DOCUMENTS

2001/0055063 A1* 12/2001 Nagai ..................... G01S 11/12
                                                          348/135
2013/0322745 A1* 12/2013 Lim .................... H04N 9/04517
                                                          382/162
(Continued)

FOREIGN PATENT DOCUMENTS

CN          103458159          12/2013
CN          105744163           7/2016
(Continued)

OTHER PUBLICATIONS

International Searching Authority, "International Search Report and Written Opinion," issued in connection with International Application No. PCT/CN2018/124735, dated Sep. 26, 2019, 9 pages.

*Primary Examiner* — Jeffery A Williams
(74) *Attorney, Agent, or Firm* — Hanley, Flight & Zimmerman

(57) ABSTRACT

An example apparatus for tracking objects includes a controller to receive a depth map, a focus distance, and an image frame of an object to be tracked. The controller is to detect the object to be tracked in the image frame and generate an object position for the object in the image frame. The controller is to calculate a deflection angle for the object based on the depth map, the focus distance, and the object position. The controller is to further rotate an imaging sensor based on the deflection angle.

22 Claims, 6 Drawing Sheets

(51) Int. Cl.
  *G03B 13/36* (2021.01)
  *H04N 5/232* (2006.01)
  *H04N 5/222* (2006.01)
  *H04N 9/73* (2023.01)

(52) U.S. Cl.
  CPC ......... *H04N 5/232122* (2018.08); *H04N 9/73* (2013.01); *G03B 2205/0069* (2013.01)

(58) Field of Classification Search
  USPC .......................................................... 348/169
  See application file for complete search history.

(56) References Cited

U.S. PATENT DOCUMENTS

2017/0221226 A1* 8/2017 Shen .......................... G06T 7/80
2018/0160034 A1   6/2018 Yang
2020/0400464 A1* 12/2020 Yedid .................... G03B 17/17

FOREIGN PATENT DOCUMENTS

| CN | 105744163 A | * | 7/2016 |
| CN | 105892668 |   | 8/2016 |
| CN | 106331471 |   | 1/2017 |
| CN | 106331471 A | * | 1/2017 |
| CN | 108198199 |   | 6/2018 |
| WO | 2017066927 |   | 4/2017 |
| WO | 2017084262 |   | 5/2017 |

* cited by examiner

200B

200A

400

TRACKING OBJECTS USING SENSOR ROTATION

BACKGROUND

Some camera systems provide angle of view adjustment by moving a camera towards a target. For example, cloud terrace camera systems move cameras using a mechanical servo system that is driven by an electrical motor with a set of gears.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, cloud terrace camera systems move cameras using a mechanical servo system that is driven by an electrical motor with a set of gears. However, such systems enable a very rough adjustment of angle of view. Moreover, the tracking of such cloud terrace camera systems may be based on an inter-frame motion vector detection. Therefore, the location system may not be very accurate. In addition, such systems may have a long response latency resulting in very slow response times that may not be suitable for real-time object tracking.

The present disclosure relates generally to techniques for tracking objects using sensor rotation. Specifically, the techniques described herein include an apparatus, method and system for tracking objects using sensor rotation. An example apparatus includes a controller to receive a depth map, a focus distance, and an image frame of an object to be tracked. The controller detects the object to be tracked in the image frame and generates an object position for the object in the image frame. The controller calculates a deflection angle for the object based on the depth map, the focus distance, and the object position. The controller also further rotates an imaging sensor based on the deflection angle.

The techniques described herein thus enable real-time object tracking. For example, the response time using a voice coil motor may be less than 33.3 milliseconds. In addition, the techniques enable more accurate tracking as the sensor of a camera may be adjusted for each captured frame. Moreover, the techniques may provide these benefits at a low cost and smaller size as compared to other solutions such as camera arrays. For example, the techniques described herein may thus be used in a variety of mobile applications, such as in drones, robotics, automobiles, or digital security systems (DSS), etc.

In some examples, the automated tracking can be used to maintain an object at the center of an angle of view of a camera sensor. Thus, the techniques enable improved detection or imaging of tracked objects by reducing lens distortion caused by imaging objects near the edges of a lens or sensor.

Figure 1:
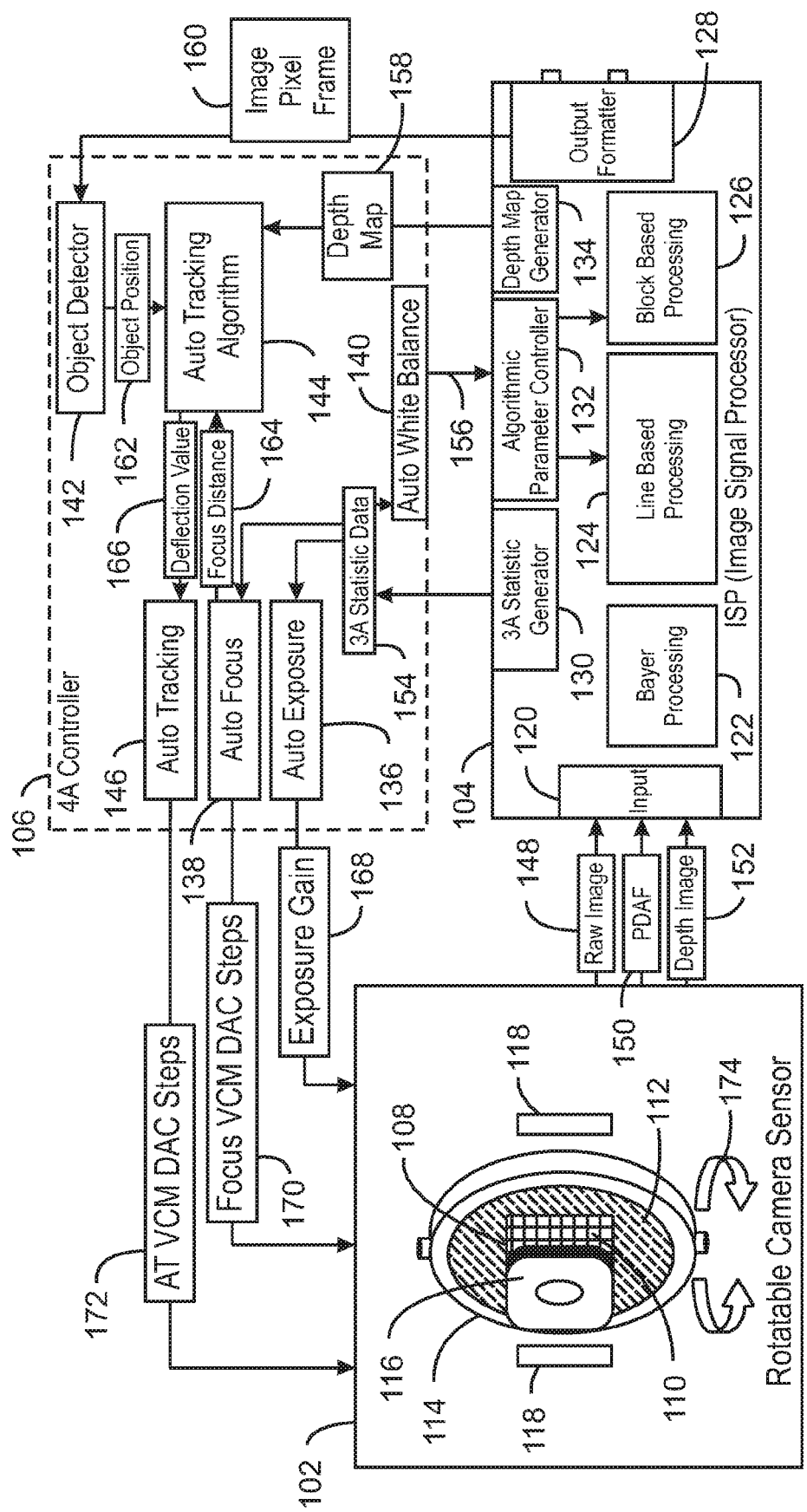
FIG. 1 is a block diagram illustrating an example system for tracking objects using sensor rotation.

FIG. 1 is a block diagram illustrating an example system for tracking objects using sensor rotation. The example system 100 can be implemented in the computing device 500 below in FIG. 5 using the process 300 of FIG. 3 or the method 400 of FIG. 4.

The example system 100 includes a rotatable camera sensor 102, an image signal processor (ISP) 104, and a 4A controller 106 that includes Auto-Tracking in addition to Auto-Exposure, Auto-Focus, and Auto-White Balance. The rotatable camera sensor 102 includes an imaging sensor 108 having a focal plane 110 indicated by intersecting vertical and horizontal lines, and a voice coil motor (VCM) plane 112 indicated by horizontal dashed lines. The rotatable camera sensor 102 includes an auto-tracking voice coil motor (VCM) 114 to adjust the VCM plane 112 about an axis. The rotatable camera sensor 102 further includes a lens voice coil motor (VCM) 116 to adjust the VCM plane 112 of the imaging sensor 108. The rotatable camera sensor 102 further includes magnets 118 to enable the auto-tracking VCM 114 to electromagnetically adjust the VCM plane 112.

The ISP 104 includes an input receiver 120 to receive various input from the rotatable camera sensor 102. The ISP 104 includes a Bayer processing module 122 to process input raw image data and generate Bayer image data. In some examples, the Bayer processing module 122 receives Mobile Industry Processor Interface (MIPI) data and outputs Bayer format image data. The ISP 104 also include a line based processing module 124 to convert Bayer image data into YUV or RGB image formats. The ISP 104 also further includes a block based processing module 126 to output pixel frame to output formatter 128 The ISP 104 also includes an output formatter 128 to output image data, including image pixel frames. For example, the image pixel frames can be output in YUV or RGB image formats. The ISP 104 includes a 3A statistic generator 130 to generate 3A statistic data. The ISP 104 also includes an algorithmic parameter controller 132 to adjust parameters of the ISP 104. In some examples, the algorithmic parameter controller 132 receives algorithmic parameters and applies the parameters to the Line based processing module 124 and Block based processing module. The ISP 104 also further includes a depth map generator 134 to generate depth maps.

The 4A controller 106 includes four automated camera controls systems. The 4A controller performs auto-tracking in addition to auto-exposure, auto-focus, and auto-white balance. For example, the 4A controller 106 includes an auto exposure module 136 to automatically determine a level of exposure for the system 100. The 4A controller 106 includes an auto focus module 138 to automatically adjust the focal plane 110 of the rotatable camera sensor 102. The 4A controller 106 includes an auto white balance module 140 to detect a color cast in a scene and adjust a temperature of colors in received image data such that white in a scene appears as a neural white in a resulting output image. The 4A controller 106 includes an object detector 142 to detect objects in received image pixel frames. The 4A controller 106 includes an auto tracking algorithm module 144 communicatively coupled to the depth map generator 134, the auto focus module 138, and the object detector 142. The 4A controller 106 includes an auto tracking module 146 communicatively coupled to the auto tracking algorithm module 144 and the auto-tracking VCM 114.

As shown in FIG. 1, the input receiver 120 of the ISP 104 receives raw image data 148, phase detection auto-focus (PDAF) data (this could be optional), and a depth image 152 from the rotatable camera sensor 102. The ISP 104 sends the 4A controller 106 3A statistic data 154 and depth maps 158, and receives auto white balance parameters 156 from the 4A controller 106.

In various examples, the 3A statistic generator 130 can generate the 3A statistic data 154 based on the raw image data 148, phase detection auto-focus (PDAF) data 150, and a depth image 152. For example, the 3A statistic data may include focus, white balance and exposure statistic grid data, such as a histogram. The PDAF data may include PDAF statistic data, pixel phase difference or original phase pixel data according to different types of PDAF camera sensor. The PDAF data is used for Auto-Focus and to speed up a focus lock.

In various examples, the raw image data 148 is processed by the Bayer processing module 122. For example, the Bayer processing module 122 can receive raw image data 148 from Camera sensor 102 through a MIPI camera serial interface (CSI) (not shown) and apply pre-processing on Bayer data (such as bad pixel correction, pixel scaling, pixel binning, etc.).

In some examples, the line based processing module 124 can receive image data from the Bayer processing module 122 and convert a Bayer pattern into an intermediate format image data. For example, the line based processing is based on lines of pixels rather than using all the pixels of a whole image. In some examples, the line based processing can start processing lines of pixels after receiving a number of lines used in processing. Thus, line based processing module 124 is performed in a line-wise manner, and can include several sub blocks responsible for first level image processing. In various examples, the line based processing module 124 outputs an intermediate format image data. For example, the intermediate format image data can be the input of block based processing unit. In various examples, the block based processing module 126 can further process the YUV or an RGB image. For example, the block based processing module 126 can receive adjusted parameters from the algorithmic parameter control 132 and generate a YUV or an RGB image with corrected white balance. In various examples, the block based processing is based on a block of pixels rather than all the pixels of a whole image. For example, the block of pixels can be 8×8, 16×16, or a 32×32 pixel block. Thus, once a block of pixels from an image is received, the block based processing module 126 can being processing an image. Processing images using line based processing module 124 and the block based processing module 126 can thus reduce latency of processing as compared to image processors that use whole images to begin processing.

In various examples, the blocked based processing module 126 can include block-wise pixel processing to enhance the image quality and outputs final YUV or RBG image.

Still referring to FIG. 1, the depth map generator 134 can generate a depth map based on received depth image 152 and send the depth map 158 to the auto tracking algorithm 144. The output formatter 128 can send an image pixel frame 160 to the object detector 142. In some examples, the image pixel frame 160 c is YUV or RGB pixel data as processed by Bayer processing module 122, Line based processing module 124, and block based processing module 126. In some examples, the image pixel frame 160 is Bayer image data directly received from Bayer processing module 122. The object detector 142 can detect an object (also multiple objects as a group, super object) to be tracked and generate an object position 162 of the object to be tracked. In some examples, the object detector 142 can track multiple objects as a group, also referred to as a super object, and generate an object position 162 for the super object. The object position 162 is sent to the auto tracking algorithm 144. The auto tracking algorithm 144 further receives a focus distance 164 from the auto focus module 138. For example, the auto focus module 138 can receive 3A statistic data 154 from the 3A statistic generator 130 and generate the focus distance 164 for a tracked object.

The auto tracking algorithm 144 generates a deflection value 166 for a tracked object based on the received object position 162, the depth map 158, and the focus distance 164. For example, the deflection value 166 may be a deflection angle indicating an angular displacement of the tracked object with respect to the rotatable camera sensor 102. In some examples, the deflection value 166 can be calculated using Eq. 1 as described with respect to FIG. 2A. The auto tracking algorithm 144 sends the deflection value 166 to an auto tracking module 146.

The auto exposure module 136 generates an exposure gain 168 based on received 3A statistic data 154 and send the exposure gain 168 to the rotatable camera sensor 102. For example, the exposure gain 168 can be used to adjust the sensitivity of the imaging sensor 108 as generally measured in ISO values. In some examples, the sensitivity of the imaging sensor 108 can be adjusted to maintain a constant exposure given a constant aperture and shutter and changing lighting conditions.

The auto focus module 138 can generate focus VCM DAC steps 170 based on the received 3A statistic data 154. The auto focus module 138 can send the VCM DAC steps 170 to a lens VCM 116 that can adjust a focal lens such that the tracked object is in focus. In other words, the lens can be adjusted using the lens VCM 116 such that focal points associated with the tracked object forming the focal plane 110 fall on the surface of the imaging sensor 108, rather than in front of or behind the imaging sensor 108.

The auto tracking module 146 can generate auto tracking (AT) voice coil motor (VCM) digital-to-analog conversion (DAC) steps based on the received deflection value 166. The auto tracking module 146 sends the AT VCM DAC steps 172 to the rotatable camera sensor 102 to drive the auto-tracking voice coil motor 114. For example, a current drive through the auto-tracking voice coil motor 114 can generate a magnetic field that interacts with a magnetic field of magnets 118. The magnetic interaction can cause an adjustment of the VCM plane 112 about an axis. For example, the VCM plane 112 can rotate in the direction of arrows 174. Thus, the imaging sensor 108 coupled to the VCM plane 112 can be rotated such that focal points corresponding to the tracked object are located in the center of the imaging sensor 108. Although FIG. 1 shows a mechanism for horizontal rotation, in some examples, the rotation mechanism can support vertical rotation, or both horizontal and vertical rotation. The resulting image of the tracked object may keep the object always in the center of a focal plane of a camera sensor. For example, the central portion of the focal plane of a camera sensor may have reduced lens distortions, such as lateral chromatic aberrations, and pincushion or barrel distortions. In various examples, the captured image of the tracked object can be output by the output formatter 128 and used in various applications. For example, the captured image can be input into an object recognition network or used in other computer vision tasks.

The diagram of FIG. 1 is not intended to indicate that the example system 100 is to include all of the components shown in FIG. 1. Rather, the example system 100 can be implemented using fewer or additional components not illustrated in FIG. 1 (e.g., additional rotational axes, voice coil motors, magnets, sensors, etc.). In various examples, the PDAF 150 may not be used. In some examples, the system 100 can also include mechanical servo system that is driven by an electrical motor with a set of gears to provide for rotation of the system itself.

Figure 2B:
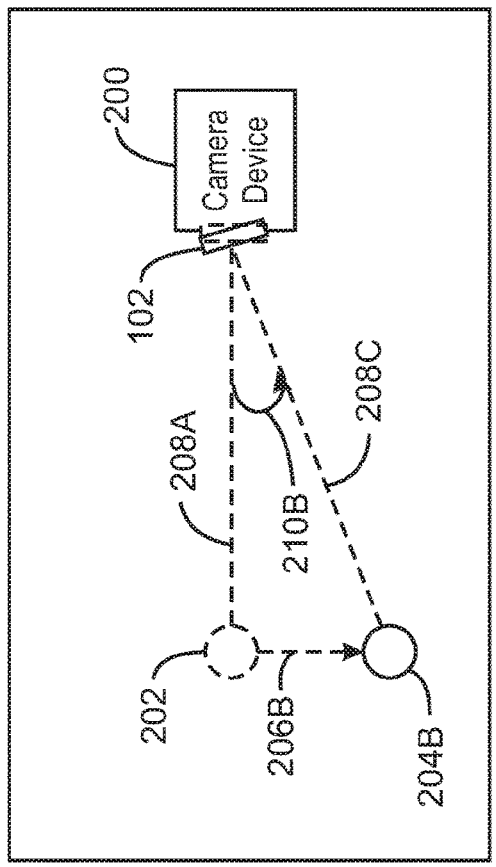
FIG. 2B is a drawings illustrating an example tracking of an object in an opposite direction.
Figure 2A:
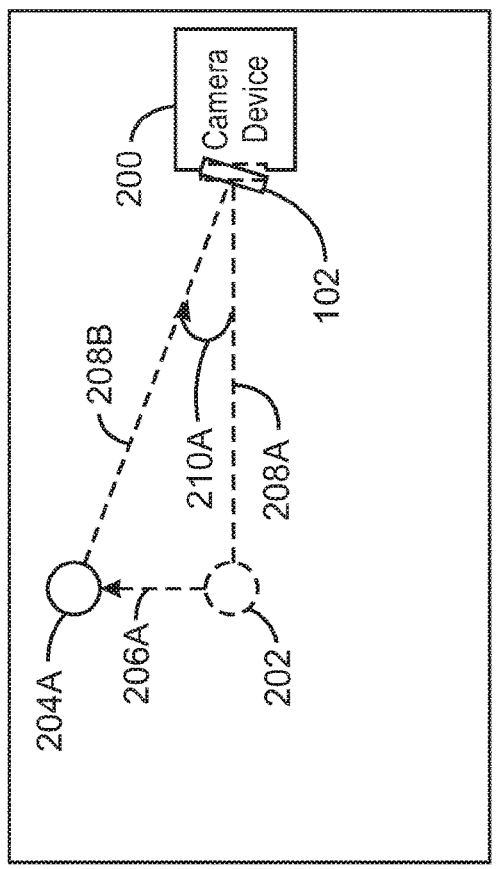
FIG. 2A is a drawings illustrating an example tracking of an object in one direction.

FIG. 2A is a drawings illustrating an example tracking of an object in one direction. The example tracking 200A can be performed using the system 100 of FIG. 1 or the computing device 500 of FIG. 5, or the computer readable media 600 of FIG. 6.

As shown in FIG. 2A, a top down view of a rotatable camera sensor 102 of camera device 200 shows the rotatable camera sensor 102 tracking an object from a first object location 202 to a second object location 204A over a displacement 206A. A first distance 208A is measured from the camera device 200 to the first object location 202. A second distance 208B is measured from the camera device 200 to the second object location 204A. An angle 210A is measured between the lines formed by the first distance 208A and the second distance 208B. For example, the angle 210A is a deflection angle that can be calculated using the equation:

$$DeflectionAngle = \arctan\left(\frac{shift}{d}\right) \quad \text{Eq. 1}$$

where shift is the displacement 206A and d is the second distance 208B.

In the example of FIG. 2A, an object begins at a first object location 202 in the focal center of the rotatable camera sensor 102 of camera device 200. The object the moves to the right side of the camera device 200 to second object location 204A. As the object moves, an auto tracking module of the camera device 200 causes the rotatable camera sensor 102 to rotate to the right such that the object remains in the center of the angle of view of the camera device 200.

FIG. 2B is a drawing illustrating an example tracking of an object in an opposite direction of the object in FIG. 2A. The example tracking 200B can be performed using the system 100 of FIG. 1 or the computing device 500 of FIG. 5, or the computer readable media 600 of FIG. 6.

As shown in FIG. 2B, a top down view of a rotatable camera sensor 102 of camera device 200 shows the rotatable camera sensor 102 tracking an object from a first object location 202 to a second object location 204B over a displacement 206B. A first distance 208A is measured from the camera device 200 to the first object location 202. A second distance 208C is measured from the camera device 200 to the second object location 204B. An angle 210B is measured between the lines formed by the first distance 208A and the second distance 208C. For example, the angle 210B can be calculated using Eq. 1, where the shift is the displacement 206B and d is the second distance 208C.

In the example of FIG. 2B, an object begins at a first object location 202 in the focal center of the rotatable camera sensor 102 of camera device 200. The object the moves to the left side of the camera device 200 to second object location 204B. As the object moves, an auto tracking module of the camera device 200 causes the rotatable camera sensor 102 to rotate to the left such that the object remains in the center of the angle of view of the camera device 200.

Figure 3:
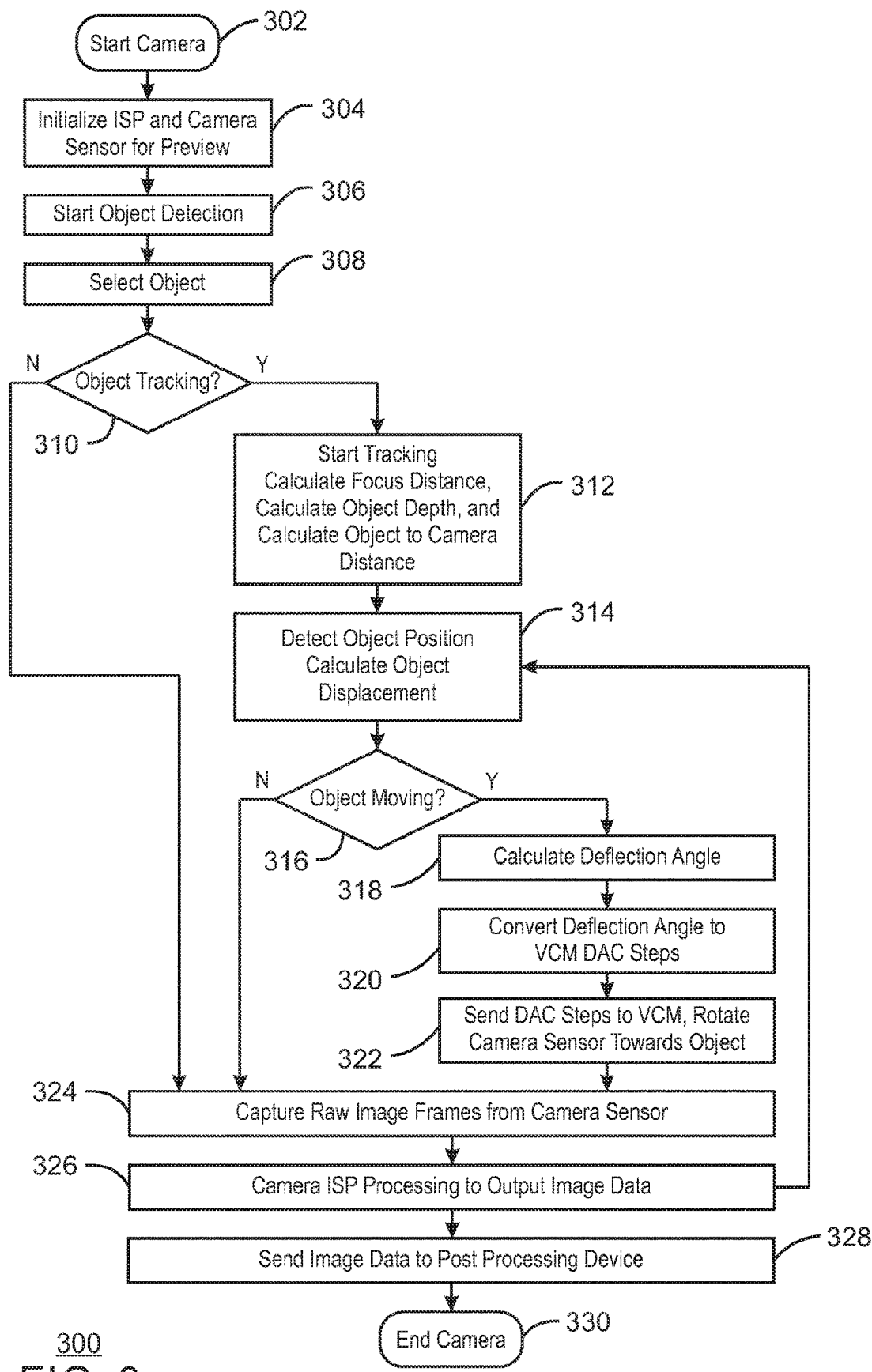
FIG. 3 is a flow diagram illustrating an example process for tracking objects using sensor rotation.

FIG. 3 is a flow chart illustrating an example process for tracking objects using sensor rotation. The example process 300 can be implemented in the system 100 of FIG. 1 or the computing device 500 of FIG. 5, or the computer readable media 600 of FIG. 6.

At block 302, a camera is started. For example, the camera may be powered on via a switch or a start signal.

At block 304, an image signal processor (ISP) and a camera sensor is initialized for preview. For example, the ISP and camera sensor may generate a preview image of a scene to be displayed on a preview screen and used for detection of objects to be tracked.

At block 306, object detection is started. For example, an object detection may have been manually started using an object detection button. In some examples, the object detection may be automatically started in response to detecting that the ISP and the camera sensor are initialized. In various examples, the object detection can detect any number of objects in the scene displayed on the preview screen.

At block 308, an object is selected. For example, the object may be selected from any number of objects detected in an image. In some examples, multiple objects are grouped as one super object. In some examples, the object is either automatically selected or manually selected by an application in response to detecting that a detected object has a confidence value above a threshold value. For example, the detected object can be a face or a person. In some examples, an object can be automatically selected based on its position in an image. For example, an object in the center of an image during selection can be automatically selected for tracking.

At decision diamond 310, a determination is made as to whether object tracking is enabled. If object tracking is detected as enabled, then the process continues at block 312. If the object tracking is not detected as enabled, then the process continues at block 324.

At block 312, in response to detecting that object tracking is enabled, the object tracking is started. In various examples, a focus distance is calculated. For example, the focus distance can be calculated based on received pixel phase difference data from a PDAF sensor or a transitional focus algorithm without a PDAF camera sensor. In some examples, an object depth is calculated. The object depth can be calculated based on a depth map calculated using a depth image. In some examples, an object-to-camera distance is calculated based on the focus distance and the object depth. For example, the object-to-camera distance can be calculated as the sum of the focus distance and the object depth as determined from a depth map.

At block 314, an object position is calculated. For example, the object position can be calculated in a number of image frames. An object displacement or shift can then be calculated based on a difference in the object position between two or multiple frames.

At decision diamond 316, a determination is made as to whether the tracked object is moving. If the tracked object is detected as moving, then the process can continue at block 318. If the tracked object is not detected as moving, then the process continues at block 324.

At block 318, a deflection angle is calculated for the moving object. In some examples, the deflection angle is calculated based on a shift distance of the moving object and the object-to-camera distance. For example, the deflection angle can be calculated using Eq. 1.

At block 320, the deflection angle is converted into voice coil motor (VCM) Digital-to-Analog Conversion (DAC) steps. For example, a VCM used to rotate a VCM plane of the sensor may operate in discrete steps. Thus, the deflection angle can be converted to a digital signal and rounded to the nearest number of VCM DAC steps.

At block 322, the VCM DAC steps are sent to the VCM to rotate a VCM plane of an imaging sensor of the camera towards the moving object. The VCM plane of the imaging sensor may then be rotated towards the moving object such that the moving object is in the center of the angle of view of the imaging sensor.

At block 324, raw image frames are captured from the camera sensor. For example, the raw image frames may indicate a quantity of light received by each of the individual imaging sensors in the camera sensor.

At block 326, the raw image frames are processed by a camera ISP and image data is output. In various examples, the image frames are processed using Bayer processing, line based processing, or block based processing, as described with respect to FIG. 1. In some examples, the image data may be output in either YUV or RGB format.

At block 328, image data is sent to a post-processing device. In various examples, the post-processing device is a JPEG or video encoder. In some examples, the post-processing device is a computer vision (CV) engine. In some examples, the post-processing device is an artificial intelligence (AI) engine. In some examples, the post-processing device is a graphics processor (GPU).

At block 330, the camera is turned off. For example, a switch can be turned to an off position or a power off signal may be received.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation. For example, the process 300 may also include rotating the camera. In some examples, the camera can be rotated in response to detecting that the sensor cannot be rotated to track the object.

Figure 4:
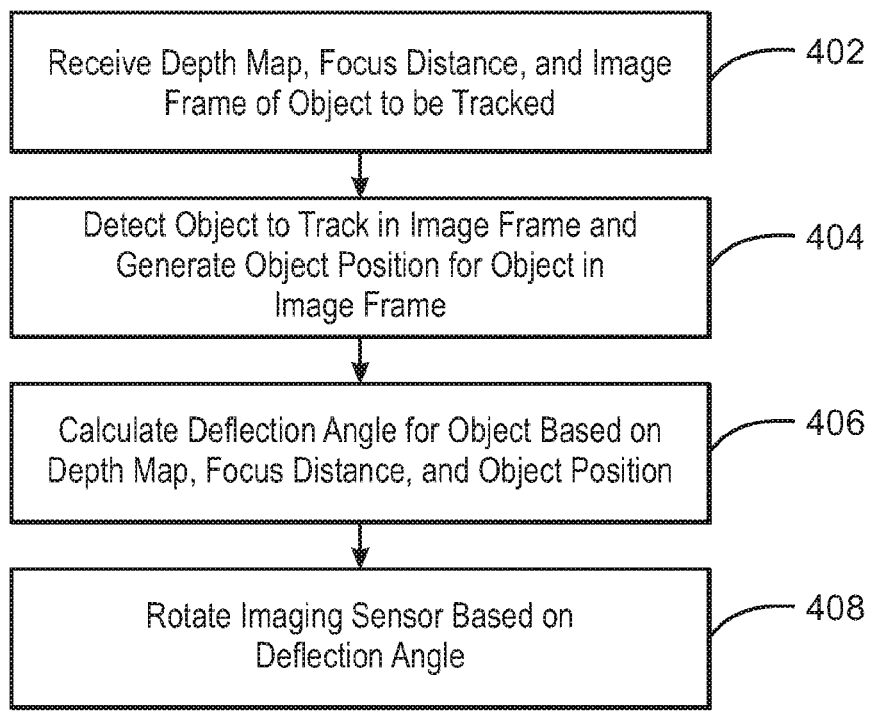
FIG. 4 is a flow chart illustrating a method for tracking objects using sensor rotation.

FIG. 4 is a flow chart illustrating a method for tracking objects using sensor rotation. The example method 400 can be implemented in the system 100 of FIG. 1, the auto tracking controller 528 of the computing device 500 of FIG. 5, or the computer readable media 600 of FIG. 6.

At block 402, a depth map, a focus distance, and an image frame of an object to be tracked are received. In some examples, the depth map and image frame are received from an image signal processor (ISP). In some examples, the focus distance is received from an auto focus module. For example, the focus distance can be generated based on received 3A statistic data. The depth map can be generated based on a received depth image from an imaging sensor.

At block 404, the object to be tracked in the image frame is detected and an object position for the object in the image frame is generated. For example, the object position may be the relative position of an object in the image frame.

At block 406, a deflection angle for the object is calculated based on the depth map, the focus distance, and the object position. For example, the deflection angle for the object can be calculated in response to detecting that the tracked object is moving. In various examples, an object-to-camera distance can be calculated based on the focus distance and the depth map. For example, the object-to-camera distance can be calculated as the sum of the focus distance and the object depth as determined from a depth map. A displacement of the moving object can be calculated based on the object position. The deflection angle can then be calculated based on the object-to-camera distance and the displacement of the moving object.

At block 408, an imaging sensor is rotated based on the deflection angle. In various examples, the imaging sensor is rotated by driving a current through a voice coil motor (VCM) coupled to the imaging sensor to generate a magnetic field that interacts with a magnetic field generated by a magnet. In some examples, auto tracking (AT) voice coil motor (VCM) digital-to-analog conversion (DAC) steps can be generated. The AT VCM DAC steps can be used to drive a current through a voice coil motor (VCM) coupled to the imaging sensor. In some examples, a current is driven through two voice coil motors (VCMs) coupled to the imaging sensor. For example, the two VCMs may control rotation in two axes, including a vertical axis and a horizontal axis.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation. For example, the method 400 may also include rotating the camera. In some examples, the camera can be rotated in response to detecting that the sensor cannot be rotated to track the object. For example, the object may move outside the angle of view of a lens.

Figure 5:
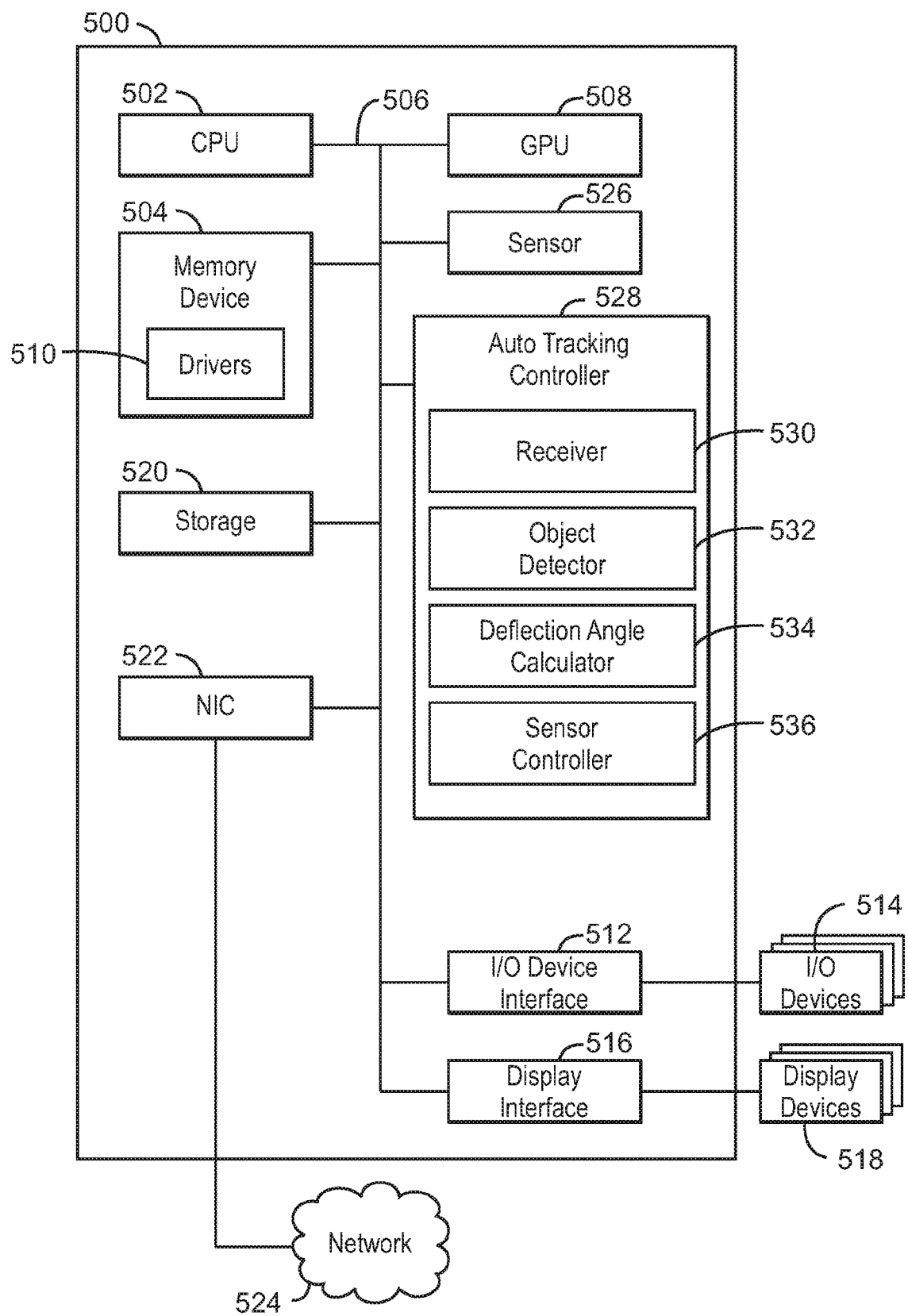
FIG. 5 is block diagram illustrating an example computing device that can track objects using sensor rotation.

Referring now to FIG. 5, a block diagram is shown illustrating an example computing device that can track objects using sensor rotation. The computing device 500 may be, for example, a laptop computer, desktop computer, tablet computer, mobile device, or wearable device, among others. In some examples, the computing device 500 may be a security camera. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random access memory (DRAM).

The memory device 504 can include random access memory (RAM), read only memory (ROM), flash memory, or any other suitable memory systems. For example, the memory device 504 may include dynamic random access memory (DRAM).

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for generating signals for rotating an imaging sensor. The device drivers 510 may be software, an application program, application code, or the like.

The CPU 502 may also be connected through the bus 506 to an input/output (I/O) device interface 512 configured to connect the computing device 500 to one or more I/O devices 514. The I/O devices 514 may include, for example, a keyboard and a pointing device, wherein the pointing device may include a touchpad or a touchscreen, among others. The I/O devices 514 may be built-in components of the computing device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the computing device 500 to a display device 518. The display device 518 may include a display screen that is a built-in component of the computing device 500. The display device 518 may also include a computer monitor, television, or projector, among others, that is internal to or externally connected to the computing device 500.

The computing device 500 also includes a storage device 520. The storage device 520 is a physical memory such as a hard drive, an optical drive, a thumbdrive, an array of drives, a solid-state drive, or any combinations thereof. The storage device 520 may also include remote storage drives.

The computing device 500 may also include a network interface controller (NIC) 522. The NIC 522 may be configured to connect the computing device 500 through the bus 506 to a network 524. The network 524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 500 further includes an imaging sensor 526. For example, the imaging sensor may include one or more sensors. In various examples, the sensors are semiconductor charge-coupled devices (CCD) or active pixel sensors in complementary metal-oxide-semiconductor (CMOS) or N-type metal-oxide-semiconductor (NMOS, Live MOS) technologies. In some examples, the sensors are Quanta Image Sensor (QIS) chips including jots that each can detect a single particle of light, also referred as a photon. In some examples, the imaging sensor 526 includes a color filter array that passes particular wavelengths of light to subsets of sensors of the imaging sensor 526. As one example, the imaging sensor 526 uses a Bayer filter pattern including 50% green, 25% red and 25% blue pixels. In some examples, the imaging sensor 526 may include a processor to generate depth information. For example, the depth information may include a depth image. In some examples, the imaging sensor 526 can include magnets arranged in the imaging sensor 526 to generate a magnetic field the controller to electromagnetically rotate the imaging sensor. In some examples, the imaging sensor 526 is coupled to a voice coil motor controlled by a controller. For example, the controller can be the sensor controller discussed below. In some examples, the imaging sensor 526 is coupled to two voice coil motors controlled by the controller, wherein a first of the two voice coil motors is to rotate the imaging sensor in a horizontal axis and a second of the two voice coil motors is to rotate the imaging sensor in a vertical axis.

The computing device 500 further includes an auto tracking controller 528. For example, the auto tracking controller 528 can be used to track objects in real time. The auto tracking controller 528 includes a receiver 530, an object detector 532, a deflection angle calculator 534, and a sensor controller 536. In some examples, each of the components 530-536 of the auto tracking controller 528 may be a microcontroller, embedded processor, or software module. In various examples, the receiver 530 receives a depth map, a focus distance, and an image frame of an object to be tracked. In some examples, the depth map is generated from a depth image received from the imaging sensor. The object detector 532 detects the object to be tracked in the image frame and generate an object position for the object in the image frame. The deflection angle calculator 534 calculates a deflection angle for the object based on the depth map, the focus distance, and the object position. For example, the deflection angle calculator 534 can calculate an object-to-camera distance based on the focus distance and the depth map. In some examples, the deflection angle calculator 534 can calculate a displacement of the moving object based on the object position. In some examples, the deflection angle calculator 534 can calculate the deflection angle based on the object-to-camera distance and the displacement of the moving object. The sensor controller 536 rotates an imaging sensor based on the deflection angle. In various examples, sensor controller 536 rotates the imaging sensor by driving a current through a voice coil motor (VCM) coupled to the imaging sensor to generate a magnetic field that interacts with a magnetic field generated by a magnet. For example, the imaging sensor can be coupled to a voice coil motor (VCM). The VCM can be driven using auto tracking (AT) voice coil motor (VCM) digital-to-analog conversion (DAC) steps generated by the controller.

The block diagram of FIG. 5 is not intended to indicate that the computing device 500 is to include all of the components shown in FIG. 5. Rather, the computing device 500 can include fewer or additional components not illustrated in FIG. 5, such as additional buffers, additional processors, and the like. The computing device 500 may include any number of additional components not shown in FIG. 5, depending on the details of the specific implementation. In some examples, the auto tracking controller 528 is a 4A controller including an auto focus unit, an auto exposure unit, and an auto white balance unit. For example, the auto focus unit can generate the focus distance based on received 3A statistic data. In some examples, the computing device 500 may also include mechanical servo for rotating the computing device 500. In some examples, the computing device 500 can be rotated in response to detecting that the imaging sensor 526 cannot be rotated to track an object. Furthermore, any of the functionalities of the receiver 530, the object detector 532, the deflection angle calculator 534, the sensor controller 536, may be partially, or entirely, implemented in hardware and/or in the processor 502. For example, the functionality may be implemented with an application specific integrated circuit, in logic implemented in the processor 502, or in any other device. In addition, any of the functionalities of the CPU 502 may be partially, or entirely, implemented in hardware and/or in a processor. For example, the functionality of the auto tracking controller 528 may be implemented with an application specific integrated circuit, in logic implemented in a processor, in logic implemented in a specialized graphics processing unit such as the GPU 508, or in any other device.

Figure 6:
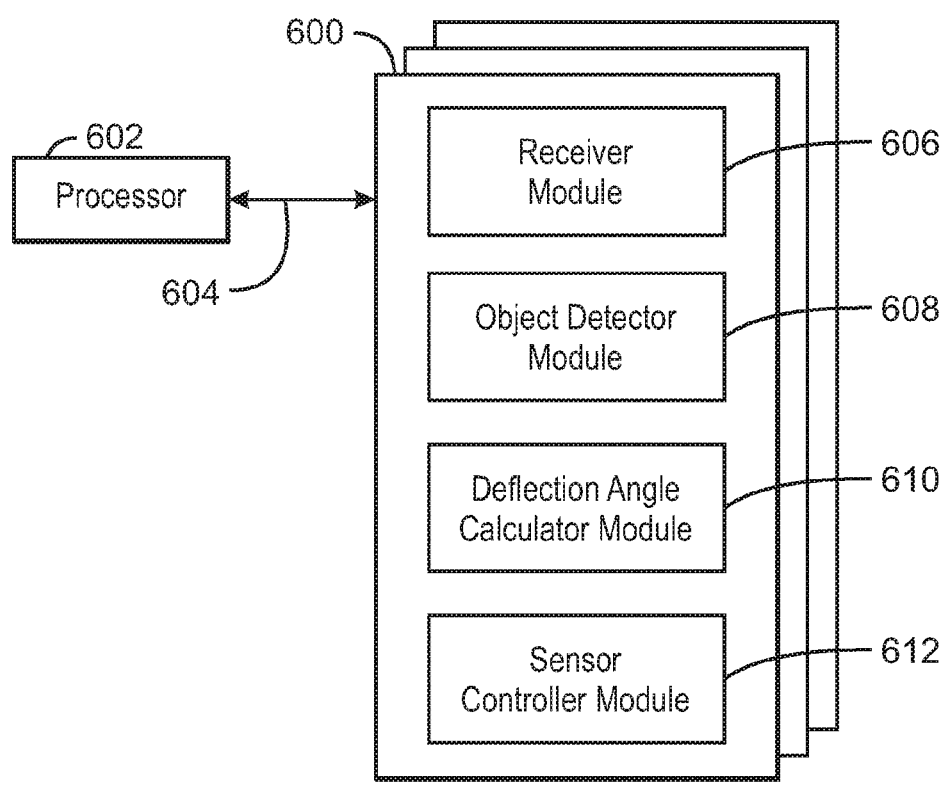
FIG. 6 is a block diagram showing computer readable media that store code for tracking objects using sensor rotation.

FIG. 6 is a block diagram showing computer readable media 600 that store code for tracking objects using sensor rotation. The computer readable media 600 may be accessed by a processor 602 over a computer bus 604. Furthermore, the computer readable medium 600 may include code configured to direct the processor 602 to perform the methods described herein. In some embodiments, the computer readable media 600 may be non-transitory computer readable media. In some examples, the computer readable media 600 may be storage media.

The various software components discussed herein may be stored on one or more computer readable media 600, as indicated in FIG. 6. For example, a receiver module 606 is configured to receive a depth map, a focus distance, and an image frame of an object to be tracked. In some examples, the focus distance is received from an auto focus module. For example, the focus distance can be generated based on received 3A statistic data. The depth map can be generated based on a received depth image from an imaging sensor.

An object detector module 608 is configured to detect the object to be tracked in the image frame and generate an object position for the object in the image frame. For example, the object position may be the relative position of an object in the image frame. A deflection angle calculator module 610 is configured to calculate a deflection angle for the object based on the depth map, the focus distance, and the object position. For example, the deflection angle calculator module 610 is configured to calculate the deflection angle for the object in response to detecting that the tracked object is moving. In various examples, the deflection angle calculator module 610 is configured to calculate an object-to-camera distance based on the focus distance and the depth map. For example, the deflection angle calculator module 610 is configured to calculate the object-to-camera distance as the sum of the focus distance and the object depth as determined from a depth map. In some examples, the deflection angle calculator module 610 is configured to calculate a displacement of the moving object based on the object position. The deflection angle calculator module 610 is configured to calculate deflection angle based on the object-to-camera distance and the displacement of the moving object.

A sensor controller module 612 is configured to rotate an imaging sensor based on the deflection angle. In various examples, the sensor controller module 612 is configured to rotate the imaging sensor by driving a current through a voice coil motor (VCM) coupled to the imaging sensor to generate a magnetic field that interacts with a magnetic field generated by a magnet. In some examples, the sensor controller module 612 is configured to generate auto tracking (AT) voice coil motor (VCM) digital-to-analog conversion (DAC) steps. The AT VCM DAC steps can be used to drive a current through a voice coil motor (VCM) coupled to the imaging sensor. In some examples, the sensor controller module 612 is configured to drive a current through two voice coil motors (VCMs) coupled to the imaging sensor. For example, the two VCMs may control rotation in two axes, including a vertical axis and a horizontal axis.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

EXAMPLES

Example 1 is an apparatus for tracking objects. The apparatus includes a controller to receive a depth map, a focus distance, and an image frame of an object to be tracked. The controller is to also detect the object to be tracked in the image frame and generate an object position for the object in the image frame. The controller is to calculate a deflection angle for the object based on the depth map, the focus distance, and the object position. The controller is to further also rotate an imaging sensor based on the deflection angle.

Example 2 includes the apparatus of example 1, including or excluding optional features. In this example, the controller is to: calculate an object-to-camera distance based on the focus distance and the depth map; calculate a displacement of the object based on the object position; and calculate the deflection angle based on the object-to-camera distance and the displacement of the object.

Example 3 includes the apparatus of any one of examples 1 to 2, including or excluding optional features. In this example, the apparatus is to rotate the imaging sensor by driving a current through a voice coil motor (VCM) coupled to the imaging sensor to generate a magnetic field that interacts with a magnetic field generated by a magnet.

Example 4 includes the apparatus of any one of examples 1 to 3, including or excluding optional features. In this example, the apparatus includes an auto focus unit to generate the focus distance based on received 3A statistic data.

Example 5 includes the apparatus of any one of examples 1 to 4, including or excluding optional features. In this example, the depth map is generated from a depth image received from the imaging sensor.

Example 6 includes the apparatus of any one of examples 1 to 5, including or excluding optional features. In this example, the imaging sensor is coupled to a voice coil motor (VCM), the VCM to be driven using auto tracking (AT) voice coil motor (VCM) digital-to-analog conversion (DAC) steps generated by the controller.

Example 7 includes the apparatus of any one of examples 1 to 6, including or excluding optional features. In this example, the imaging sensor includes a plurality of magnets arranged in the imaging sensor to generate a magnetic field, the controller to electromagnetically rotate the imaging sensor.

Example 8 includes the apparatus of any one of examples 1 to 7, including or excluding optional features. In this example, the imaging sensor is coupled to a voice coil motor controlled by the controller.

Example 9 includes the apparatus of any one of examples 1 to 8, including or excluding optional features. In this example, the imaging sensor is coupled to two voice coil motors controlled by the controller, wherein a first of the two voice coil motors is to rotate the imaging sensor in a horizontal axis and a second of the two voice coil motors is to rotate the imaging sensor in a vertical axis.

Example 10 includes the apparatus of any one of examples 1 to 9, including or excluding optional features. In this example, the controller includes a 4A controller including an auto focus unit, an auto exposure unit, and an auto white balance unit.

Example 11 is a method for tracking objects. The method includes receiving, via a processor, a depth map, a focus distance, and an image frame of an object to be tracked. The method also includes detecting, via the processor, the object to track in the image frame and generating an object position for the object in the image frame. The method further includes calculating, via the processor, a deflection angle for the object based on the depth map, the focus distance, and the object position. The method also further includes rotating, via the processor, an imaging sensor based on the deflection angle.

Example 12 includes the method of example 11, including or excluding optional features. In this example, calculating the deflection angle includes: calculating an object-to-camera distance based on the focus distance and the depth map; calculating a displacement of the object based on the object position; and calculating the deflection angle based on the object-to-camera distance and the displacement of the object.

Example 13 includes the method of any one of examples 11 to 12, including or excluding optional features. In this example, the method includes generating the focus distance based on received 3A statistic data.

Example 14 includes the method of any one of examples 11 to 13, including or excluding optional features. In this example, the method includes generating the depth map based on a received depth image.

Example 15 includes the method of any one of examples 11 to 14, including or excluding optional features. In this example, rotating the imaging sensor includes driving a current through a voice coil motor (VCM) coupled to the imaging sensor to generate a first magnetic field that interacts with a second magnetic field generated by a magnet.

Example 16 includes the method of any one of examples 11 to 15, including or excluding optional features. In this example, rotating the imaging sensor includes generating auto tracking (AT) voice coil motor (VCM) digital-to-analog conversion (DAC) steps to be used to drive a current through a voice coil motor (VCM) coupled to the imaging sensor.

Example 17 includes the method of any one of examples 11 to 16, including or excluding optional features. In this example, calculating the deflection angle for the object is performed in response to detecting that the tracked object is moving.

Example 18 includes the method of any one of examples 11 to 17, including or excluding optional features. In this example, rotating the imaging sensor includes driving a current through two voice coil motors (VCMs) coupled to the imaging sensor.

Example 19 includes the method of any one of examples 11 to 18, including or excluding optional features. In this example, the method includes generating the focus distance based on received 3A statistic data.

Example 20 includes the method of any one of examples 11 to 19, including or excluding optional features. In this example, the method includes rotating a camera including the imaging sensor in response to detecting that the imaging sensor cannot be rotated to track the object.

Example 21 is at least one computer readable medium for processing images having instructions stored therein that direct the processor to receive a depth map, a focus distance, and an image frame of an object to be tracked. The computer-readable medium includes instructions that direct the processor to detect the object to track in the image frame and generating an object position for the object in the image frame. The computer-readable medium includes instructions that direct the processor to calculate a deflection angle for the object based on the depth map, the focus distance, and the object position. The computer-readable medium includes instructions that direct the processor to rotate an imaging sensor based on the deflection angle.

Example 22 includes the computer-readable medium of example 21, including or excluding optional features. In this example, the computer-readable medium includes instructions to: calculate an object-to-camera distance based on the focus distance and the depth map; calculate a displacement of the object based on the object position; and calculate the deflection angle based on the object-to-camera distance and the displacement of the object.

Example 23 includes the computer-readable medium of any one of examples 21 to 22, including or excluding optional features. In this example, the computer-readable medium includes instructions to generate the focus distance based on received 3A statistic data.

Example 24 includes the computer-readable medium of any one of examples 21 to 23, including or excluding optional features. In this example, the computer-readable medium includes instructions to generate the depth map based on a received depth image.

Example 25 includes the computer-readable medium of any one of examples 21 to 24, including or excluding optional features. In this example, the computer-readable medium includes instructions to drive a current through a voice coil motor (VCM) coupled to the imaging sensor to generate a first magnetic field that interacts with a second magnetic field generated by a magnet.

Example 26 includes the computer-readable medium of any one of examples 21 to 25, including or excluding optional features. In this example, the computer-readable medium includes instructions to generate auto tracking (AT) voice coil motor (VCM) digital-to-analog conversion (DAC) steps to be used to drive a current through a voice coil motor (VCM) coupled to the imaging sensor.

Example 27 includes the computer-readable medium of any one of examples 21 to 26, including or excluding optional features. In this example, the computer-readable medium includes instructions to calculate the deflection angle for the object in response to detecting that the tracked object is moving.

Example 28 includes the computer-readable medium of any one of examples 21 to 27, including or excluding optional features. In this example, the computer-readable medium includes instructions to drive a current through two voice coil motors (VCMs) coupled to the imaging sensor.

Example 29 includes the computer-readable medium of any one of examples 21 to 28, including or excluding optional features. In this example, the computer-readable medium includes instructions to generate the focus distance based on received 3A statistic data.

Example 30 includes the computer-readable medium of any one of examples 21 to 29, including or excluding optional features. In this example, the computer-readable medium includes instructions to rotate a camera including the imaging sensor in response to detecting that the imaging sensor cannot be rotated to track the object.

Example 31 is a system for tracking objects. The system includes a controller to receive a depth map, a focus distance, and an image frame of an object to be tracked. The controller is to detect the object to be tracked in the image frame and generate an object position for the object in the image frame. The controller is to also calculate a deflection angle for the object based on the depth map, the focus distance, and the object position. The controller is to further rotate an imaging sensor based on the deflection angle.

Example 32 includes the system of example 31, including or excluding optional features. In this example, the controller is to: calculate an object-to-camera distance based on the focus distance and the depth map; calculate a displacement of the object based on the object position; and calculate the deflection angle based on the object-to-camera distance and the displacement of the object.

Example 33 includes the system of any one of examples 31 to 32, including or excluding optional features. In this example, the system is to rotate the imaging sensor by driving a current through a voice coil motor (VCM) coupled to the imaging sensor to generate a magnetic field that interacts with a magnetic field generated by a magnet.

Example 34 includes the system of any one of examples 31 to 33, including or excluding optional features. In this example, the system includes an auto focus unit to generate the focus distance based on received 3A statistic data.

Example 35 includes the system of any one of examples 31 to 34, including or excluding optional features. In this example, the depth map is generated from a depth image received from the imaging sensor.

Example 36 includes the system of any one of examples 31 to 35, including or excluding optional features. In this example, the imaging sensor is coupled to a voice coil motor (VCM), the VCM to be driven using auto tracking (AT) voice coil motor (VCM) digital-to-analog conversion (DAC) steps generated by the controller.

Example 37 includes the system of any one of examples 31 to 36, including or excluding optional features. In this example, the imaging sensor includes a plurality of magnets arranged in the imaging sensor to generate a magnetic field the controller to electromagnetically rotate the imaging sensor.

Example 38 includes the system of any one of examples 31 to 37, including or excluding optional features. In this example, the imaging sensor is coupled to a voice coil motor controlled by the controller.

Example 39 includes the system of any one of examples 31 to 38, including or excluding optional features. In this example, the imaging sensor is coupled to two voice coil motors controlled by the controller, wherein a first of the two voice coil motors is to rotate the imaging sensor in a horizontal axis and a second of the two voice coil motors is to rotate the imaging sensor in a vertical axis.

Example 40 includes the system of any one of examples 31 to 39, including or excluding optional features. In this example, the controller includes a 4A controller including an auto focus unit, an auto exposure unit, and an auto white balance unit.

Example 41 is a system for tracking objects. The system includes means for receiving a depth map, a focus distance, and an image frame of an object to be tracked. The system includes means for detecting the object to be tracked in the image frame and generating an object position for the object in the image frame. The system includes means for calculating a deflection angle for the object based on the depth map, the focus distance, and the object position. The system includes means for rotating an imaging sensor based on the deflection angle.

Example 42 includes the system of example 41, including or excluding optional features. In this example, the system includes means for calculating an object-to-camera distance based on the focus distance and the depth map; means for calculating a displacement of the object based on the object position; and means for calculating the deflection angle based on the object-to-camera distance and the displacement of the object.

Example 43 includes the system of any one of examples 41 to 42, including or excluding optional features. In this example, the system includes means for generating the focus distance based on received 3A statistic data.

Example 44 includes the system of any one of examples 41 to 43, including or excluding optional features. In this example, the system includes means for generating the depth map based on a received depth image.

Example 45 includes the system of any one of examples 41 to 44, including or excluding optional features. In this example, the system includes means for rotating a camera including the imaging sensor.

Example 46 includes the system of any one of examples 41 to 45, including or excluding optional features. In this example, the imaging sensor is coupled to a voice coil motor (VCM), the VCM to be driven using auto tracking (AT) voice coil motor (VCM) digital-to-analog conversion (DAC) steps generated by the means for rotating the imaging sensor.

Example 47 includes the system of any one of examples 41 to 46, including or excluding optional features. In this example, the imaging sensor includes means for generating a magnetic field, the means for rotating the imaging sensor to electromagnetically rotate the imaging sensor.

Example 48 includes the system of any one of examples 41 to 47, including or excluding optional features. In this example, the imaging sensor is coupled to a voice coil motor controlled by the means for rotating the imaging sensor.

Example 49 includes the system of any one of examples 41 to 48, including or excluding optional features. In this example, the imaging sensor is coupled to two voice coil motors controlled by the means for rotating the imaging sensor, wherein a first of the two voice coil motors is to rotate the imaging sensor in a horizontal axis and a second of the two voice coil motors is to rotate the imaging sensor in a vertical axis.

Example 50 includes the system of any one of examples 41 to 49, including or excluding optional features. In this example, the means for receiving the depth map, the means for detecting the object, the means for calculating the deflection angle, and the means for rotating the imaging sensor includes a 4A controller including an auto focus unit, an auto exposure unit, and an auto white balance unit.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for tracking objects, the apparatus comprising controller circuitry to:
    detect an object to be tracked in an image frame and generate an object position for the object in the image frame;
    calculate an object-to-camera distance based on a focus distance and a depth map;
    calculate a displacement of the object based on the object position;
    calculate a deflection angle for the object based on the object-to-camera distance and the displacement of the object; and
    rotate an image sensor based on the deflection angle.

2. The apparatus of claim 1, wherein the apparatus is to rotate the image sensor by powering a voice coil motor (VCM) coupled to the image sensor to generate a magnetic field that interacts with a magnetic field generated by a magnet.

3. The apparatus of claim 1, further including an auto focus unit to generate the focus distance based on received 3A statistic data.

4. The apparatus of claim 1, wherein the depth map is generated from a depth image from the image sensor.

5. An apparatus for tracking objects, the apparatus comprising:
    controller circuitry to:
        generate an object position for an object to be tracked in an image frame;
        calculate a deflection angle for the object based on a depth map, a focus distance, and the object position; and
        rotate an image sensor based on the deflection angle, wherein the image sensor is coupled to a voice coil motor (VCM), the VCM to be driven using auto tracking (AT) voice coil motor (VCM) digital-to-analog conversion (DAC) steps generated by the controller.

6. The apparatus of claim 1, wherein the image sensor includes a plurality of magnets in the image sensor to generate a magnetic field, the controller circuitry to electromagnetically rotate the image sensor.

7. The apparatus of claim 1, wherein the image sensor is coupled to a voice coil motor controlled by the controller circuitry.

8. The apparatus of claim 1, wherein the image sensor is coupled to two voice coil motors controlled by the controller circuitry, and wherein a first of the two voice coil motors is to rotate the image sensor in a horizontal axis and a second of the two voice coil motors is to rotate the image sensor in a vertical axis.

9. The apparatus of claim 1, wherein the controller circuitry includes a 4A controller including an auto focus unit, an auto exposure unit, and an auto white balance unit.

10. A method for tracking objects, the method comprising:
    detecting, via at least one processor, an object to track in an image frame and generating an object position for the object in the image frame;
    calculating, via the at least one processor, an object-to-camera distance based on a focus distance and a depth map;
    calculating, via the at least one processor, a displacement of the object based on the object position; and
    calculating, via the at least one processor, a deflection angle for the object based on the object-to-camera distance and the displacement of the object;
    and
    rotating an image sensor based on the deflection angle.

11. The method of claim 10, further including generating, via the at least one processor, the focus distance based on received 3A statistic data.

12. The method of claim 10, further including generating, via the at least one processor, the depth map based on a received depth image.

13. The method of claim 10, wherein the rotating of the image sensor includes powering a voice coil motor (VCM) coupled to the image sensor to generate a first magnetic field that interacts with a second magnetic field generated by a magnet.

14. A method for tracking objects, the method comprising:
    detecting, with control circuitry, an object to track in an image frame and generating an object position for the object in the image frame;
    calculating, with the control circuitry, a deflection angle for the object based on a depth map, a focus distance, and the object position; and
    causing rotation of an image sensor based on the deflection angle, wherein the causing of the rotation of the image sensor includes generating auto tracking (AT) voice coil motor (VCM) digital-to-analog conversion (DAC) steps to power a voice coil motor (VCM) coupled to the image sensor.

15. The method of claim 10, wherein the calculating of the deflection angle for the object is performed in response to detecting that the tracked object is moving.

16. The method of claim 10, wherein the rotating of the image sensor includes driving a current through two voice coil motors (VCMs) coupled to the image sensor.

17. The method of claim 10, further including generating the focus distance based on received 3A statistic data.

18. A method for tracking objects, the method comprising:
    detecting an object to track in an image frame and generating an object position for the object in the image frame;
    calculating, with processor circuitry, a deflection angle for the object based on a depth map, a focus distance, and the object position;
    rotating an image sensor based on the deflection angle; and
    rotating a camera including the image sensor in response to detecting that the image sensor cannot be rotated to track the object.

19. A system for tracking objects, comprising:
means for detecting an object to be tracked in an image frame and generating an object position for the object in the image frame;
means for calculating an object-to-camera distance based on a focus distance and a depth map;
means for calculating a displacement of the object based on the object position;
means for calculating a deflection angle for the object based on the object-to-camera distance and the displacement of the object;
and
means for rotating an image sensor based on the deflection angle.

20. The system of claim 19, further including means for generating the focus distance based on received 3A statistic data.

21. The apparatus of claim 1, wherein the controller circuitry includes processor circuitry, and further including instructions to be executed by the processor circuitry.

22. The apparatus of claim 5, wherein the controller circuitry includes processor circuitry, and further including instructions to be executed by the processor circuitry.

\* \* \* \* \*